United States Patent
Bharadwaj et al.

(10) Patent No.: US 12,182,536 B2
(45) Date of Patent: Dec. 31, 2024

(54) METHOD AND SYSTEM FOR EXTRACTABLE RANDOMNESS SCALING IN QUANTUM RANDOM NUMBER GENERATORS

(71) Applicant: INSTITUT NATIONAL DE LA RECHERCHE SCIENTIFIQUE, Québec (CA)

(72) Inventors: Shashwath Shankar Bharadwaj, Brookline, MA (US); James Van Howe, Davenport, IA (US); Piotr Roztocki, Longueuil (CA); Yoann Jestin, Montréal (CA); José Azaña, Montréal (CA); Roberto Morandotti, Montréal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 841 days.

(21) Appl. No.: 17/305,669

(22) Filed: Jul. 13, 2021

(65) Prior Publication Data
US 2022/0019409 A1    Jan. 20, 2022

Related U.S. Application Data

(60) Provisional application No. 63/051,539, filed on Jul. 14, 2020.

(51) Int. Cl.
*G06F 7/58* (2006.01)
(52) U.S. Cl.
CPC .................... *G06F 7/588* (2013.01)
(58) Field of Classification Search
CPC . G06F 7/58; G06F 7/582; G06F 7/584; G06F 7/586; G06F 7/588
See application file for complete search history.

(56) References Cited

U.S. PATENT DOCUMENTS

| 6,986,056 B1 | 1/2006 | Dultz et al. |
| 9,423,819 B2 | 8/2016 | Marandi et al. |

(Continued)

FOREIGN PATENT DOCUMENTS

| DE | 102014202312 A1 | 8/2015 |
| WO | 2019125733 A1 | 6/2019 |

OTHER PUBLICATIONS

Wayne, Michael A., "Optical Quantum Random No. Generation: Applications of Single-Photon Event Timing". Dissertation. University of Illinois at Urbana-Champaign, 2017. (Year: 2017).*

(Continued)

*Primary Examiner* — Andrew Caldwell
*Assistant Examiner* — Markus Anthony Villanueva
(74) *Attorney, Agent, or Firm* — LAVERY, DE BILLY, LLP; Gwendoline Bruneau

(57) ABSTRACT

A method for entropy scaling in quantum random number generators, comprising dividing one spatial mode into multiple spatial modes, delaying each spatial mode, and recombing the spatial modes; detecting first temporal states with synchronisation to a photon generation time and encoding the first temporal states into first time bins; detecting second temporal states in an arbitrary clock, and encoding the second temporal states into second time-bins. The method comprises dividing a source of single photons into two paths in a first beam splitter and recombining the two paths in a next beam splitter, repeatedly, in a cascade of n beam splitters, consecutive beam splitters being separated by a length of fiber, yielding a number $I=2^n$ of temporal states for each photon; detecting first temporal states by measuring a photon rate in a temporal window selected to measure photon arrival times, with synchronisation to a generation time of the photons, and encoding the first temporal states into first time bins, a number of the first temporal states (Continued)

being $I=2^n$; detecting second temporal states by measuring a photon rate in the selected temporal window, in absence of synchronisation to the generation time of the photon, and encoding the second temporal states into second time-bins, a number of the second time bins being $N_v$; thereby generating a state space for each photon of $N_v \times I$.

13 Claims, 4 Drawing Sheets

(56) References Cited

U.S. PATENT DOCUMENTS

| | | | |
|---|---|---|---|
| 9,471,279 B2 | 10/2016 | Shi et al. | |
| 10,019,235 B2 | 7/2018 | Nordholt et al. | |
| 2004/0139132 A1* | 7/2004 | Lutkenhaus | G06F 7/588 |
| | | | 708/250 |
| 2017/0019185 A1* | 1/2017 | Agarwal | H04J 14/00 |
| 2019/0243611 A1* | 8/2019 | Martin | G06F 7/588 |
| 2022/0283781 A1* | 9/2022 | Lim | G06N 10/40 |

OTHER PUBLICATIONS

Raffaelli, Francesco. "Quantum random No. generators in integrated photonics". Thesis. University of Bristol. (Dec. 2018). (Year: 2018).*

Yan, Q., Zhao, B., Hua, Z., Liao, Q., Yang, H .; High-speed quantum-random No. generation by continuous measurement of arrival time of photons. Rev. Sci. Instrum. Jul. 1, 2015; 86 (7): 073113. (Year: 2015).*

Z. L. Yuan, M. Lucamarini, J. F. Dynes, B. Frohlich, A. Plews, and A. J. Shields, Robust random No. generation using steady-state emission of gain-switched laser diodes, Applied Physics Letters 104, 261112 (2014).

M. Imran, V. Sorianello, F. Fresi, L. Poti, and M. Romagnoli, Quantum Random No. Generator based on Phase Diffusion in Lasers using an On-chip Tunable SOI Unbalanced Mach-Zehnder Interferometer (uMZI), Optical Fiber Communication Conference (OFC) 2020 (Optical Society of America, San Diego, California, 2020), p. M1D.5.

N. Metropolis and S. Ulam, The Monte Carlo Method, Journal of the American Statistical Association 44, 335 (1949).

M. Kues et al., On-chip generation of high-dimensional entangled quantum states and their coherent control, Nature 546, 622 (2017).

M. A. Wayne and P. G. Kwiat, Low-bias high-speed quantum random No. generator via shaped optical pulses, Opt. Express 18, 9351 (2010).

F. Raffaelli, P. Sibson, J. E. Kennard, D. H. Mahler, M. G. Thompson, and J. C. F. Matthews, Generation of random numbers by measuring phase fluctuations from a laser diode with a silicon-on-insulator chip, Opt. Express 26, 19730 (2018).

F. Xu, J. H. Shapiro, and F. N. C. Wong, Experimental fast quantum random number generation using high-dimensional entanglement with entropy monitoring, Optica 3, 1266 (2016).

K. Ma, F. Xu, H. Xu, X. Tan, B. Qi, and H.-K. Lo, Postprocessing for quantum random-number generators: Entropy evaluation and randomness extraction, Physical Review A 87, 062327 (2013).

G. Vallone, D. G. Marangon, M. Tomasin, and P. Villoresi, Quantum randomness certified by the uncertainty principle, Physical Review A 90, 052327 (2014).

M. Tomamichel and R. Renner, Uncertainty Relation for Smooth Entropies, Physical Review Letters 106, 110506 (2011).

F. Furrer, T. Franz, M. Berta, A. Leverrier, V. B. Scholz, M. Tomamichel, and R. F. Werner, Continuous Variable Quantum Key Distribution: Finite-Key Analysis of Composable Security against Coherent Attacks, Physical Review Letters 109, 100502 (2012).

Y. Liu et al., High-Speed Device-Independent Quantum Random Number Generation without a Detection Loophole, Physical Review Letters 120, 010503 (2018).

Y. Zhang et al., Experimental Low-Latency Device-Independent Quantum Randomness, Physical Review Letters 124, 010505 (2020).

K. Ma, X. Yuan, Z. Cao, B. Qi, and Z. Zhang, Quantum random number generation, npj Quantum Information 2, 16021 (2016).

M. Kues, C. Reimer, J. M. Lukens, W. J. Munro, A. M. Weiner, D. J. Moss, and R. Morandotti, Quantum optical microcombs, Nature Photonics 13, 170 (2019).

P. Bierhorst et al., Experimentally generated randomness certified by the impossibility of superluminal signals, Nature 556, 223 (2018).

Y. Liu et al., Device-independent quantum random-number generation, Nature 562, 548 (2018).

Y.-Q. Nie, H.-F. Zhang, Z. Zhang, J. Wang, X. Ma, J. Zhang, and J.-W. Pan, Practical and fast quantum random number generation based on photon arrival time relative to external reference, Applied Physics Letters 104, 051110 (2014).

M. Grafe et al., On-chip generation of high-order single-photon W-states, Nature Photonics 8, 791 (2014).

S. Tanzilli, W. Tittel, H. De Riedmatten, H. Zbinden, P. Baldi, M. DeMicheli, D. B. Ostrowsky, and N. Gisin, PPLN waveguide for quantum communication, The European Physical Journal D—Atomic, Molecular, Optical and Plasma Physics 18, 155 (2002).

C. Abellan, W. Amaya, M. Jofre, M. Curty, A. Acin, J. Capmany, V. Pruneri, and M. W. Mitchell, Ultra-fast quantum randomness generation by accelerated phase diffusion in a pulsed laser diode, Opt. Express 22, 1645 (2014).

Shashwath S Bharadwaj et al., Entropy Scaling in Photonic Trusted-Device Quantum Random No. Generators, © 2020 The Authors.

Oesterling et al., Journal of Modern Optics 62, 1722 (2015).

M. A. Wayne, E. R. Jeffrey, G. M. Akselrod, and P. G. Kwiat, Journal of Modern Optics 56, 516 (2009).

K. Guo, C. Cheng, M. Wu, Q. Gao, P. Li, and Y. Guo, Opt. Lett. 44, 5566 (2019).

* cited by examiner

METHOD AND SYSTEM FOR EXTRACTABLE RANDOMNESS SCALING IN QUANTUM RANDOM NUMBER GENERATORS

CROSS REFERENCE TO RELATED APPLICATIONS

This application claims benefit of U.S. provisional application Ser. No. 63/051,539, filed on Jul. 14, 2020. All documents above are incorporated herein in their entirety by reference.

FIELD OF THE INVENTION

The present invention relates to quantum random number generators. More specifically, the present invention is concerned with a system and a method for extractable randomness scaling in quantum random number generators.

BACKGROUND OF THE INVENTION

Random numbers are a central resource for applications ranging from cryptography to statistical simulations. Most current random number generators (RNGs) work according to the laws of classical physics and are therefore deterministic in nature, which limits their ability to correctly model truly random phenomena, while quantum random number generators (QRNGs) are based on the inherent indeterminism in quantum mechanical systems, thus producing genuine randomness.

Most current quantum random number generator research has been focused on optimizing speed and security, by optimizing random bit generation rate and certifiability of genuine randomness respectively. A first approach to increase the random bitrate involves increasing the dimensionality i.e. the encoding levels of the system space spanned by the detected photons using the temporal, spectral and spatial degrees of freedom for example, so as to increase the number of random bits extracted per detected photon, which in turn increases the random bitrate; a second approach involves the use of ultrafast sources of single photons and detectors with low dead-time and jitter metrics, to increase the number of physical detections per unit time, hence the random bitrate. The security or certified genuine randomness of quantum random number generators has been improved using complex experimental designs and/or measurement protocols; for example, bits obtained from self-testing quantum random number generators are certified to be quantum mechanically random using a loophole-free violation of the Bell inequality, which involves a complex experimental design to ensure coherent projection measurements.

Irrespective of the parameter being optimized, current solutions to improve quantum random number generators performance lead to an increase of the overall system cost, the design complexity or both. For instance, the increase in the dimensionality of measurement bases using temporal mode encoding is limited by the dead time and jitter of detectors and the coherence time of a single photon for example, and is optimized at the expense of by improving state-of-the-art components, using superconducting nanowire single photon detectors or single photon sources. This becomes particularly challenging in already deployed infrastructures due to backward compatibility of components, measurement techniques, postprocessing and communication protocols etc. Alternatively, the state space of photon arrivals can be increased using a plurality of spatial modes for example, which allows to reduce the dependency on expensive sources and high-performance detectors, but increases design complexity since a single photon detector for each spatial mode is needed, which is extremely costly even in case of a small number of modes. Furthermore, such quantum random number generators being designed and optimized on a case-by-case basis in relation to the specific sources, detectors, and components used, hence generally not very versatile or tunable, a complete overhaul of components and architecture is typically required to achieve an improvement in performance. Such high equipment costs, increased design complexities, and lack of tunable control of operational parameters result in a bottleneck for the development of quantum random number generators in commercial devices.

In the end, current implementations maintain a trade-off between speed, through random bit generation rate, and security, through certifiability of genuine randomness. Thus, trusted-device quantum random number generators achieve a fast bitrate at the cost of certification, while self-testing quantum random number generators achieve good certification but poor bitrates. Despite significant advances in quantum random number generators in recent years, state-of-the-art implementations at most thus only partially meet the requirements of commercial applications such as both high bitrates and high security, and since a given quantum random number generator implementation has fixed performance parameters, improvements to meet increased application requirements is only achieved at the cost of a completely new architecture or by replacing costly and complex components. Such limitations restrict quantum random number generators use in industrial applications despite their ability to model truly random phenomena better than classical alternatives currently in use.

There is still a need in the art for a system and a method for extractable randomness scaling in quantum random number generators.

SUMMARY OF THE INVENTION

More specifically, in accordance with the present invention, there is provided a method for entropy scaling in quantum random number generators, comprising dividing a source of single photons into two paths in a first beam splitter and recombining the two paths in a next beam splitter, repeatedly, in a cascade of beam splitters, consecutive beam splitters being separated by a length of fiber, until a last beam splitter; yielding a number $I=2^n$ of temporal states for each photon, where n is the number of beam splitters in the cascade; detecting first temporal states by measuring a photon rate in a temporal window selected to measure photon arrival times, with synchronisation to a generation time of the photons, and encoding the first temporal states into first time bins, a number of the first temporal states being $I=2^n$; detecting second temporal states by measuring a photon rate in the selected temporal window, in absence of synchronisation to the generation time of the photon, and encoding the second temporal states into second time-bins, a number of the second time bins being $N_v$; thereby generating a state space for each photon of $N_v \times I$.

There is further provided a method for entropy scaling in quantum random number generators, comprising dividing one spatial mode into multiple spatial modes, delaying each spatial mode, and recombing the spatial modes; detecting first temporal states with synchronisation to a photon generation time and encoding the first temporal states into first time bins; detecting second temporal states in an arbitrary clock, and encoding the second temporal states into second time-bins.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

A method for entropy scaling according to an embodiment of an aspect of the present disclosure comprises dividing a source of single photons into two paths in a first fiber-based beam splitter and recombining as an input in a next fiber-based beam splitter, repeatedly, using a variable number of cascaded fiber-based beam splitters, until a last beam splitter, with different fiber lengths between their outputs. Given a generation time $T_{gen}$ for each photon, a number $I=2^n$ of temporal states in which each photon can be detected is thus obtained, where n is the number of beam splitters in the cascade.

Figure 1:
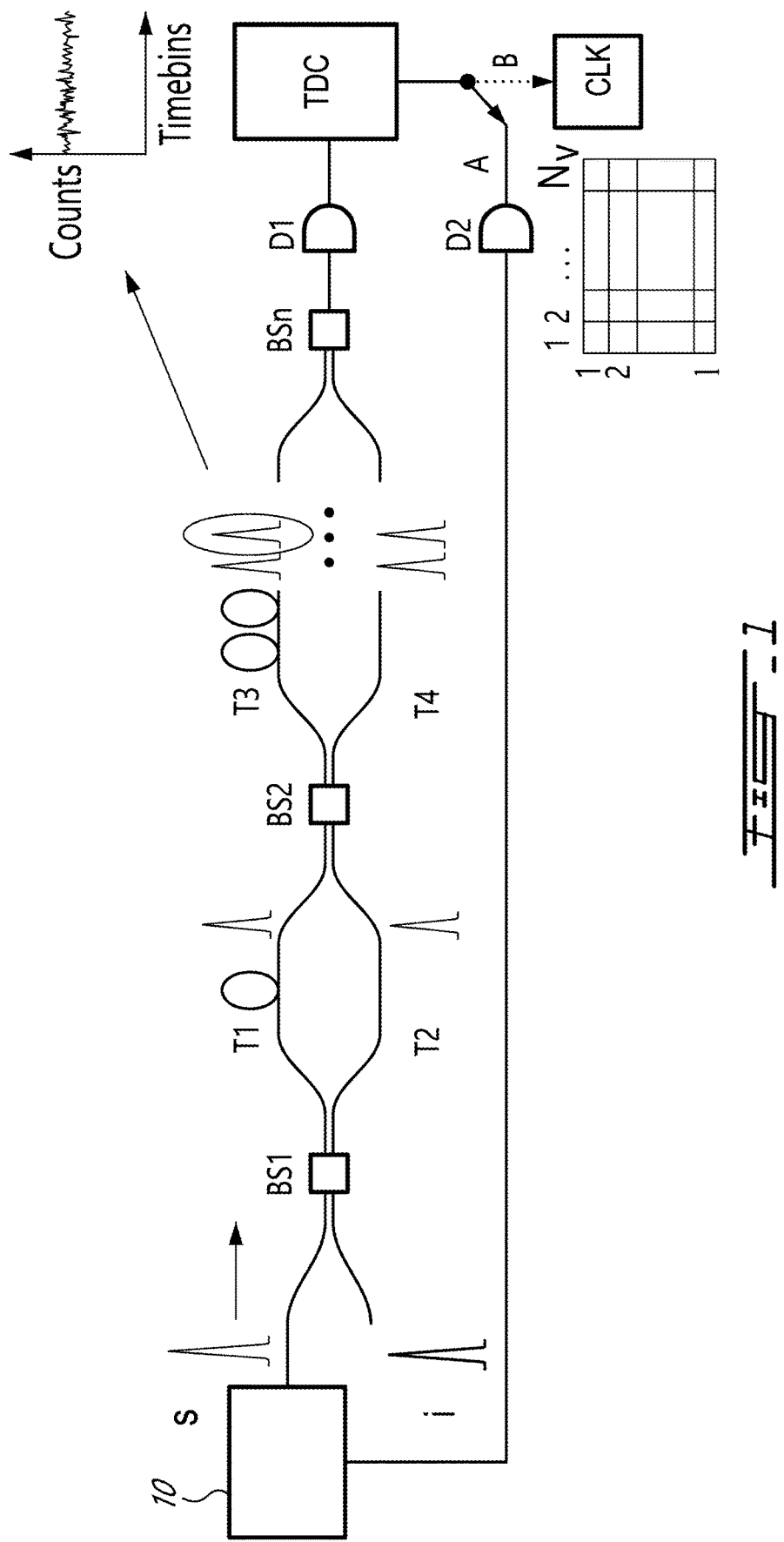
FIG. 1 is a schematical view of a system according to an embodiment of an aspect of the present disclosure.

For example, using two beam splitters BS1, BS2 as illustrated in FIG. 1, four temporal states that each photon can occupy at the detectors D1 and D2 are obtained, corresponding to delays $T_{gen}+T1+T3$, $T_{gen}+T1+T4$, $T_{gen}+T2+T3$ and $T_{gen}+T2+T4$, where T1, T2, T3, and T4 are the temporal delays introduced by the four possible fiber paths available to the emitted signal in the cascade. These temporal states corresponding to physical components in the system are detected and a time to digital converter (TDC) is used to provide a digital representation of their time of arrival at the detector. They are converted to first time-bins, referred to herein as physical time bins.

The physical time bins are measured by measuring $T_{gen}$ using a heralding photon from the signal-idler photon pair s, I of a correlated source, in a position of the system see position A in FIG. 1), in which the signal photon from the source 10 is input into the beam splitters and the simultaneously emitted idler is used as the clock trigger to measure the photon delay time and photon rate.

Since photon generation is a spontaneous process, $T_{gen}$ varies randomly with respect to any clock signal in the lab frame. Without synchronization to the photons generation times, an overlap of the physical time-bins introduced by the randomness scheme is detected, resulting in a uniform distribution of equally probable random arrival times of photons with respect to the lab clock. In the present disclosure, in an arbitrary lab clock (See position B as shown in FIG. 1), the random photon arrival times are measured within a clock window selected to measure photon arrival times, and the detected temporal states are encoded, using the arbitrary lab clock as a reference time frame, into time-bins that represent bits in positions that are not determined by physical components in the system, referred to herein as virtual time-bins. In the switch A position, time-division multiplexing of a spatial mode quantum random number generator is achieved, and in position B temporal-mode quantum random number generation is achieved. Combining physical time-bins from position A and virtual bins from position B allows optimum scalability, by operating in switch position A while making use of measurement parameters in position B.

One spatial mode is divided into multiple spatial modes by a beam splitter, each one of the new modes is delayed so that the photons take distinct physical paths, and then each path is recombined. Spatial modes are thus effectively multiplexed as new multiple temporal states onto one spatial mode. In addition, each of the I physical modes contain $N_v$ virtual temporal possibilities as described hereinabove such that the entire state space is equivalent to $N_v \times I$, where $N_v$ is the number of virtual time-bins and $I=2^n$ is the number of physical time-bins, n being the number of beam splitters in the system. The system of FIG. 1, using beam splitters and delays, thus combines a temporal mode quantum random number generator and a spatial mode quantum random number generator into a single, simple device, to scale the dimensionality of detected photon events and achieve extractable randomness, hence increasing the usefulness of the quantum random number generator.

The result of the cascade of beam splitters on photon arrival times in the present system and method can be described using a matrix generation times and physical time-bin positions as the two basis vectors as shown in the lower inset of FIG. 1. The area (rows*columns) of the matrix gives state space. In the present example with $I=2-16$ physical time-bins and $N_v=100$ virtual time-bins, $I \times N_v=200-1,600$ temporal states are obtained, by operating the system in position A while allowing 100 virtual bins to populate for each possible physical path. In contrast, virtual time-bin encoding with one physical dimension, or temporal mode encoding alone, yields a state space of only one row of the matrix, and the number of states can only be increased by lengthening the detection observation time window or by improving detector characteristics, or by increasing the number of spatial paths and using a detector for each path.

In the present disclosure, besides increasing the number of states a photon can occupy, the overall entropy per photon is scaled, without changing the properties of the source or the detector in the system, using the minimum entropy per bit of photon arrival events $H_\eta$, determined as follows:

$$H_\eta = 1 - \frac{H_{dev}}{\log_2(Nv) + n} \quad (1)$$

where $N_v$ is equal to the total number of virtual time-bins, $n$ is the number of beam splitters in the scaling cascade and $H_{dev}$ accounts for source and detector nonidealities, including multiphoton emission, finite detector resolution, imperfect efficiency, and noise such as background noise and dark counts for example.

Thus the minimum entropy per bit of photon arrival events $H_\eta$ represents the efficiency that a given quantum random number generator makes use of all its potential randomness, and in case of an ideal quantum random number generator $H_{dev}=0$ and $H_\eta=1$, resulting in 100% random photon arrivals.

In practice, $H_{dev}$ is non-zero due to non-idealities, and implemented quantum random number generators deviate from truly random behavior. In the present system and method, beam splitters are added in the cascade, each additional beam splitter resulting in an increase of the minimum entropy per bit of photon arrival events $H_\eta$, only limited by the source and detector non-idealities and losses accumulated in the beam splitters. As shown for example in FIG. 2 in the case of a periodically poled lithium niobate (PPLN) waveguide source of entangled photons with system nonidealities such that $H_{dev}=3.6$, increasing the number of beam splitters from 0 to 4 results in the minimum entropy per bit increasing from 54.3% to 65.3%. The effects of randomness scaling are found increased in case of lower quality sources and detectors. For example, when $H_{dev}=5$, the increase in $H_\eta$ reaches 29%.

The random bitrate is determined as follows:

$$\text{Bitrate} = H_{dev} * (\log_2(N_V) + n) * \text{Photon rate} \quad (2)$$

The random bitrate being directly proportional to the minimum entropy per bit of photon arrival events $H_\eta$, increasing the minimum entropy per bit of photon arrival events $H_\eta$ translates into an increase in the random bit rate. In the system of FIG. 1, an optimized region of operation with a number of beam splitters n between 2 and 3 is obtained, in which the increase in the minimum entropy per bit of photon arrival events $H_\eta$ is dominant over the increase in losses in the cascade with each additional beam splitter, resulting in increased bitrate. The minimum entropy per bit of photon arrival events $H_\eta$ can then be further increased by selecting high quality sources and/or low loss, integrated beam splitters, to further increase the bitrate.

As discussed hereinabove, for maximum bit generation and randomness scaling, the system is operated in switch position A of FIG. 1 while simultaneously using virtual mode encoding shown in position B, with a source of photons with known or probable generation time, such as an attenuated pulsed laser source, an entangled photon source, a heralded photon source, or a photon source from which a second correlated signal can be derived, for example. Experiments using an attenuated continuous wase (CW) laser source and then using an entangled photon pairs source will now be described, as proof-of-concept for randomness scaling in switch position B in FIG. 1.

Light emitted from an attenuated laser with low enough average photon number, $\bar{n}<0.1$ per observation time, follows a Poissonian distribution and the attenuated laser source can be treated as a single photon source. The minimum entropy associated with the detection of the photon is determined as follows:

$$H_{min} = \log_2(N_v) + \log_2(1-e^{-\lambda T\gamma}) - \log_2(\lambda T\gamma) \quad (3)$$

where $N_v$ is the number of virtual time bins in the encoding scheme, characterizes laser intensity, $\gamma$ is the efficiency of the detector and T is the duration of observation as determined by the deadtime of the detector. The terms $\log_2(1-e^{-\lambda T\gamma}) - \log_2(\lambda T\gamma)$ are obtained after correcting for multiphoton counts, timing jitter of the detector, etc., which contribute erroneously towards randomness in the raw collected data.

Since each photon arriving at the randomness cascaded beam splitter section can propagate $2^n$ different paths, this relation becomes:

$$H_{min} = \log_2(N_v) + n + \log_2(1-e^{-\lambda T\gamma}) - \log_2(\lambda T\gamma) \quad (4)$$

The additional entropy introduced by the cascaded beam splitter section shows up in the collected data as the minimum entropy per bit, which is determined as follows:

$$H_\eta = 1 - \frac{H_{dev}}{\log_2(N_v) + n} \quad (5)$$

where $$H_{dev} = \log_2(1-e^{-\lambda T\gamma}) - \log_2(\lambda T\gamma) \quad (6)$$

In the case of the entangled photon pairs source, an $N_v$-dimensional biphoton state, obtained through different spontaneous processes in nonlinear media such as spontaneous four wave mixing (SFWM) in micro-ring resonators, or spontaneous parametric down-conversion (SPDC) in periodically poled lithium niobate (PPLN) waveguides for example, can be characterized as follows:

$$|\psi\rangle = \Sigma_{i=1}^{N_v} |i\rangle_A \otimes |i\rangle_B \quad (7)$$

where $|i\rangle$ represents a single photon at a discretized time interval i. It has been shown that the smooth minimum entropy, accounting for environmental noise, of such a state, using higher-dimensional time-bin encoding, can be bound using the uncertainty principle as follows, when measured in two different settings:

$$H_{min} \geq -\log_2 c - H_{max} \quad (8)$$

where c is the maximum overlap between two mutually unbiased projective measurements from incompatible positive operator valued measures (POVMs), and $H_{max}$ is the maximum entropy, which is the Renyi entropy of order ½ giving weight to events with small surprisal and can be modeled to account for measurement inaccuracies so that it varies proportionally with the number of virtual time-bins $N_v$. Since for each value of i, there exist $2^n$ temporal states in which the photon can be measured at the detector, the maximum overlap c is:

$$c = \frac{1}{N_v * 2^n} \quad (9)$$

Further, the minimum entropy per bit can also be described by Relation (6) by substituting $H_{dev}$ with $H_{max}$.

In the presently discussed experiments, a CW laser (Net Test Tunics Plus) with emission centered at 1547.6 nm wavelength and with a linewidth of 100 MHz was used as an attenuated source. The output of the laser was attenuated by means of two stacked variable optical attenuators, leading to 25 kHz photon flux at the detector. This corresponds to an average photon number, $\bar{n}<0.1$, for the 100 ns temporal window selected to measure photon arrival times. For the spontaneous parametric down-conversion (SPDC), the same laser was used as a pump for a two-stage periodically poled lithium niobate (PPLN) waveguide source of entangled photons. In this setup, the first PPLN is used for second harmonic generation (SHG) to convert the 1547.6 nm light to 773.8 nm, which is then used to pump the second PPLN waveguide for SPDC in order to generate entangled photon pairs, for which degenerate photons are centered at 1547.6 nm. Both periodically poled lithium niobate waveguide sources of entangled photons (PPLNs) are commercial devices (Srico 2000). High-rejection bandpass filters were used to block residual pump light not converted by second harmonic generation (SHG) or spontaneous parametric down-conversion (SPDC) respectively. Although the total spontaneous parametric down-conversion (SPDC) bandwidth was at least 4 THz and too large to be measured by the laboratory equipment used, a telecom programmable filter (Finisar 4000A waveshaper) was used to select 25 GHz each of signal and idler bandwidths of non-degenerate spontaneous parametric down-conversion (SPDC) photons. By pumping the first waveguide source of entangled photons (PPLN) at 1 mW, 100 µW of second harmonic generation (SHG) was produced, which gives a detected spontaneous parametric down-conversion (SPDC) photon rate of 13 kHz for signal and idler channels. Superconducting nanowire single photon detectors (Quantum Opus One) were used for all experiments, featuring a deadtime of 80 ns, an efficiency of 85% at 1550 nm, and a resolution (jitter) of about 400 ps. Photon detection events were recorded by a time-to-digital converter (Picoquant Hydraharp 400), used to give the difference in photon arrival time between a trigger and a detection event. Two different triggers, namely the detected idler photon (FIG. 1 switch position A) and an arbitrary lab clock (FIG. 1 switch position B) which was selected to be a pulse train at 10 MHz from an arbitrary function generator (Tektronix AFG 3251), were used.

The randomness scheme consists of 1-4 polarization maintaining 50/50 fiber couplers (AFW PFC-15-2-50-BB) connected as shown in FIG. 1. The couplers used in the experiment had an average insertion loss, including loss due to mating sleeves and fiber delays, of about 1 dB each and their splitting ratios deviated from 50/50 by at most 2%. Larger deviations in splitting ratios would be detrimental for random bit generation as it would cause a reduction in minimum entropy per bit due to a decrease in possible photon states.

Figure 3:
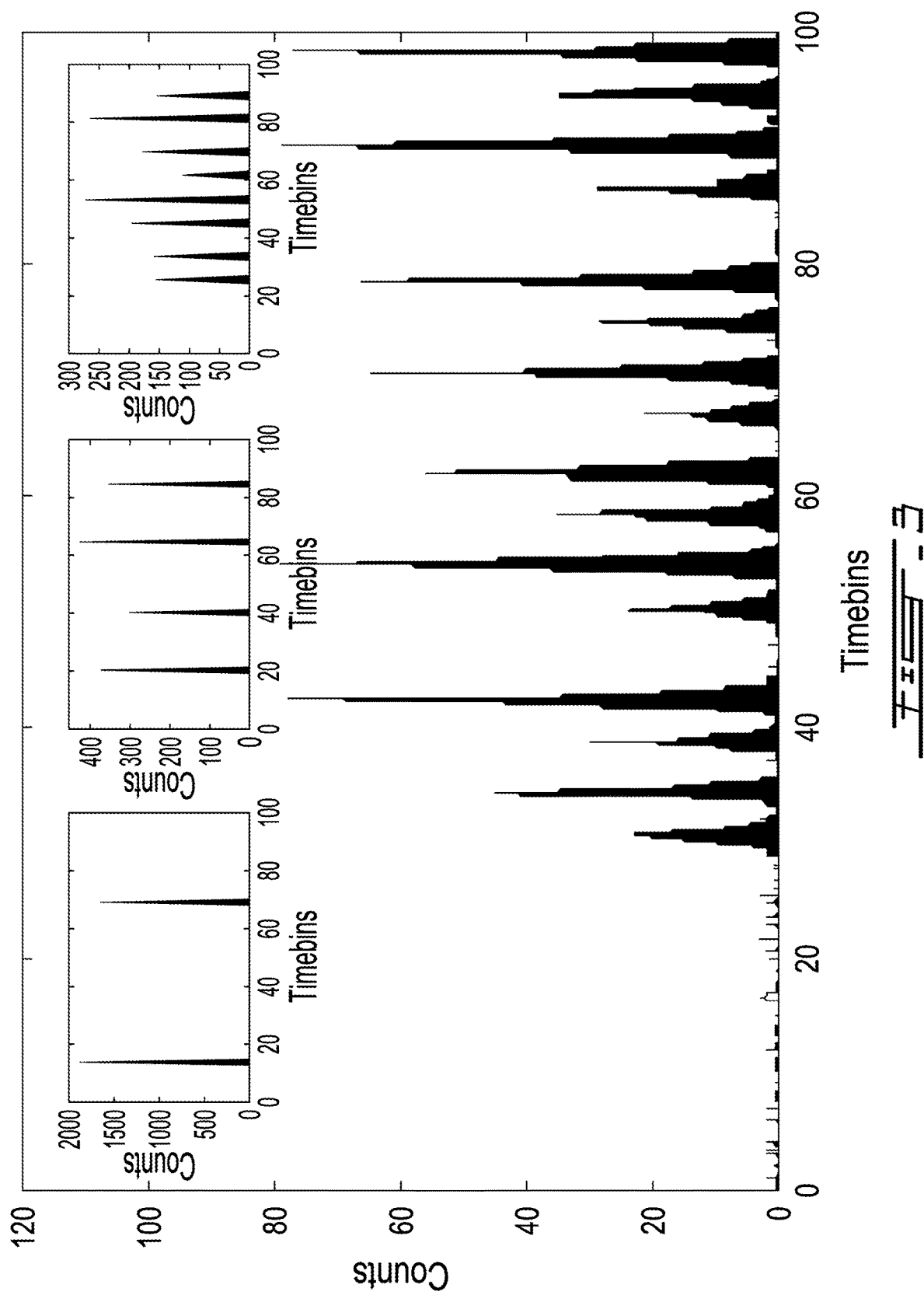
FIG. 3 shows a histogram of the arrival times of signal photon (physical time bins) at the detectors using the idler as a clock trigger for 1, 2, 3 (inset: left-right) and 4 beam splitters.

In order to generate separate, nonoverlapping physical time-bins, fiber delays were used on all the beam splitters outputs ranging from 0.20-4.0 m. FIG. 3 shows the histogram of photon arrival times using the idler as the trigger. Additionally, the coincidence-to-accidental rate (CAR) of the system ranges from 200 to 1200 depending on the number of beam splitters, and hence losses, in the system.

Figure 4:
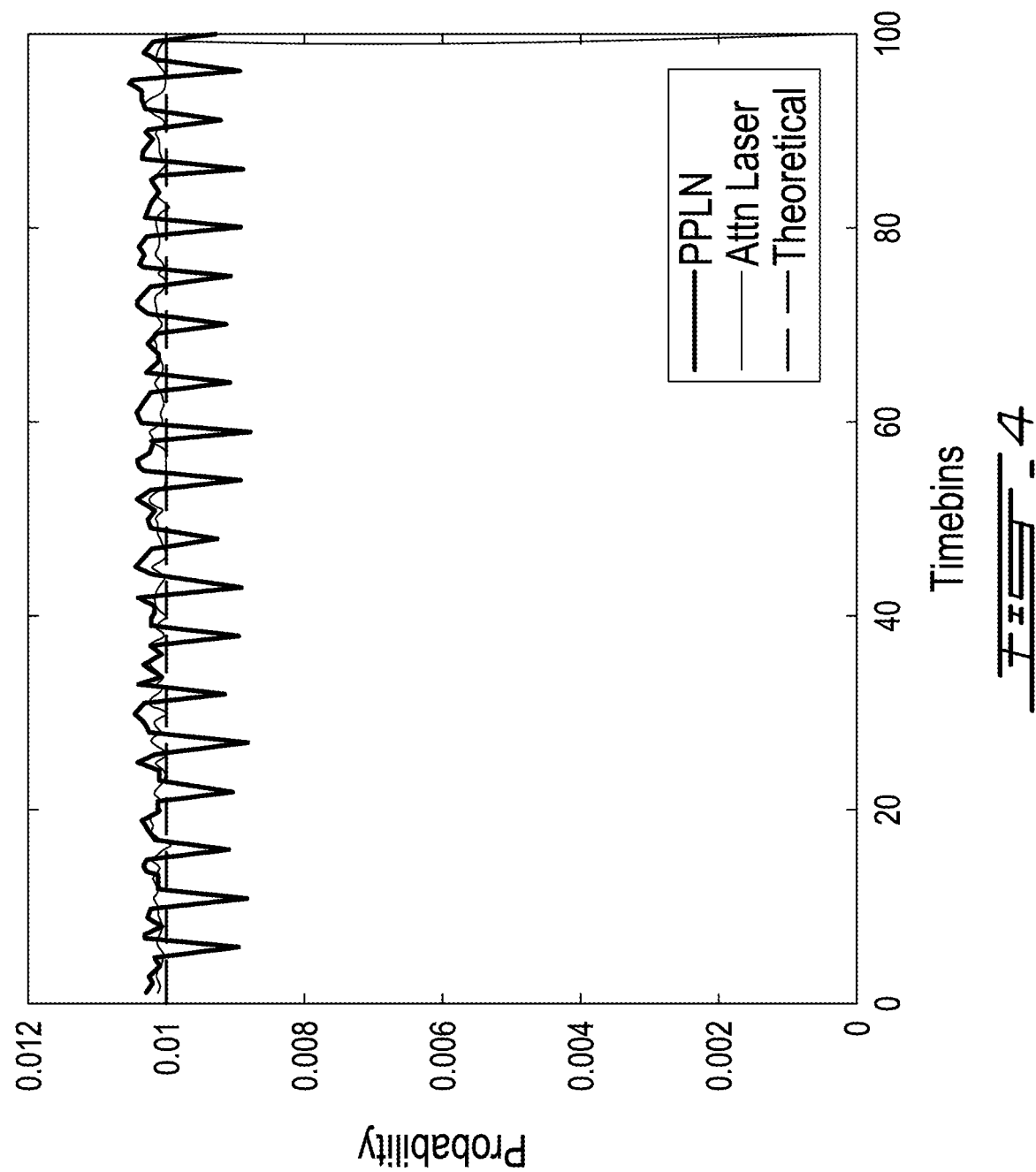
FIG. 4 shows a histogram of the arrival times (virtual time bins) at the detectors for photons emitted by a periodically poled lithium niobate waveguide sources of entangled photons and an attenuated laser, respectively, using a 10 MHz lab clock.

FIG. 4 shows the distribution of photon arrival-times when the clock is in position B in FIG. 1 for various physical bins in position A, corresponding to the active mode of the quantum random number generator for generating random bits. The observation window was selected to about the detector deadtime be 100 ns, the width of each time bin of 1 ns was selected, i.e. more than 2 times worse than the actual resolution in order to simulate practical systems where a detector resolution of 1.0 ns is a more realistic number, giving an Nv=100. Ultimately Nv is a free parameter limited by the dead time of the detector, which sets the largest observation window, and detector resolution, which sets the smallest bin width. The distributions of both sources are near-uniform as expected. In optimal operation, 16 copies, corresponding to the physical states (FIG. 3), are produced serially, corresponding to an entire window of 1600 ns.

Figure 2:
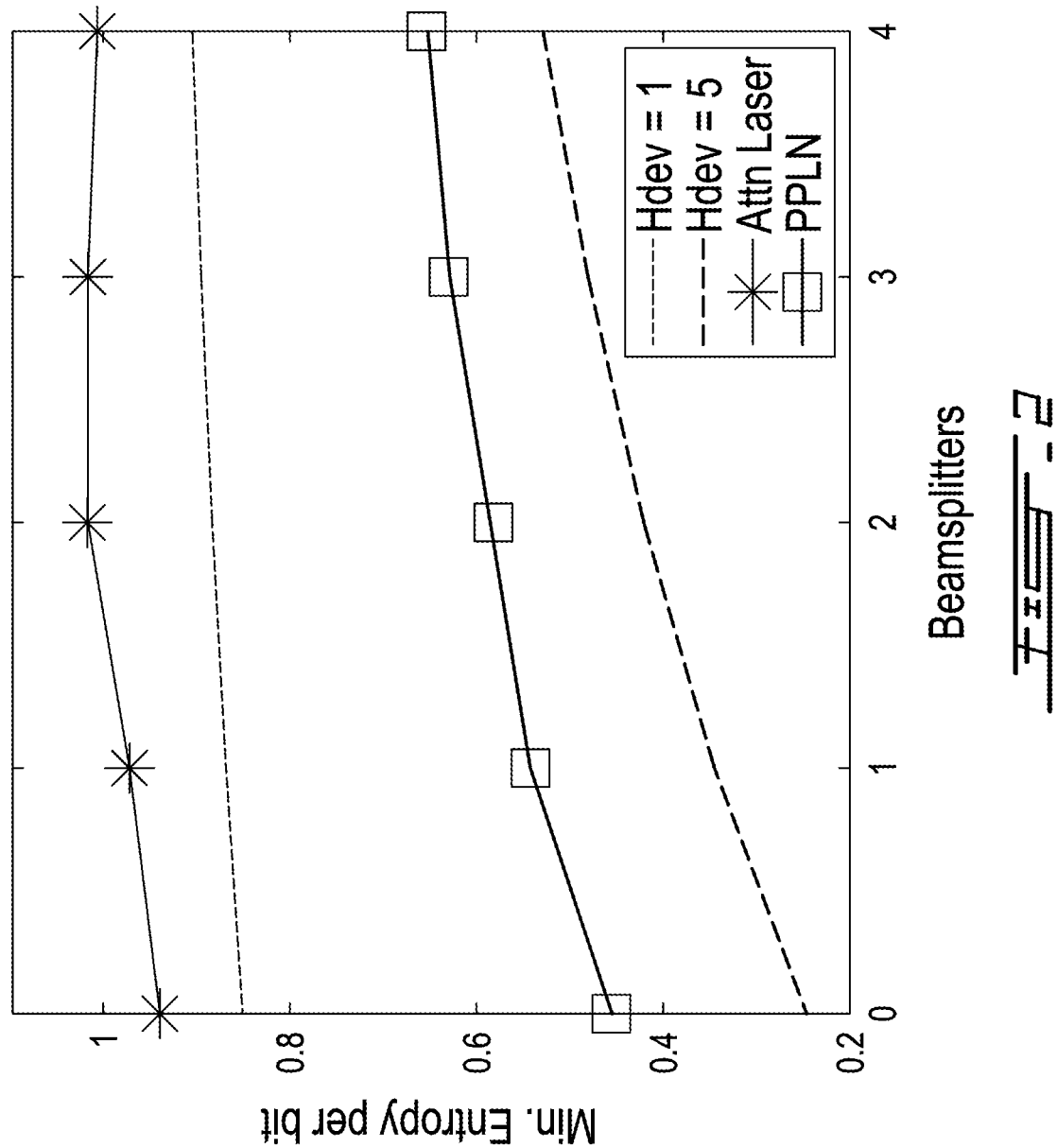
FIG. 2 shows the minimum entropy per bit as a function of the number of beam splitters in the system of FIG. 1, data points showing experimental measurements and dashed curves showing theoretical predictions for attenuated lasers (Attn Laser) and periodically poled lithium niobate (PPLN) waveguide sources of entangled photons.

It can be seen from FIG. 2, that the experimental scaling of $H_\eta$ closely matches theoretical predictions. In general, it is expected that increasing the number of physical paths should improve the efficiency of randomness. For the attenuated laser used in this experiment, $H_\eta$ already begins at a high value of 97.25% and hits the maximum of 100% by adding two beam splitters. For this laser, $H_{dev}$ is so low that increasing the number of modes has a small effect on randomness, the system already allowing almost all the randomness in the system for bit generation. However, the increase in losses due to the inclusion of more fiber beam splitters affects the detected photon flux, which prevents an arbitrary increase in bitrate of this system. For the entangled PPLN waveguide source, $H_\eta$ increases much more dramatically, from 54.3% to 65.3%, as the number of beam splitters increases from 0 to 4. In general, FIG. 2 shows that increasing the number of beam splitters is particularly significant with higher values of $H_{dev}$. For example, when $H_{dev}=5$, which can be obtained by changing source and detector parameters such as Nv from 100 to about 500, for example by using a suitable PPLN source, the increase in $H_\eta$ is as high as 29%. This indicates that the scheme is particularly useful in cases with increased source/detector non-idealities, which makes it even more amenable to application in real world systems. It is noted that the experimental value of $H_\eta$ changes negligibly as the integration time varied from 30 s to 60 minutes, which indicates that asymptotic behaviour is achieved for relatively short data collection times. Thus, finite size effects are not dominant in the present data and a significant change in the values of $H_\eta$ is not likely to be observed with the accumulation of more data. Finally, it is noted from the data in FIG. 2 that the attenuated laser used for the experiment outperforms the source of entangled photons with regards to randomness parameters, indicating that entangled photon sources do not offer an inherent advantage in such a temporal mode quantum random number generator configuration.

The data in FIG. 2 were also used to calculate the scaling in random bitrate (see Relation (2) above):

$$\text{Bitrate} = \text{Total Minimum Entropy} * \text{Photon Flux} = H_\eta * (\log_2(N_v)+n) * \text{Detected Photon rate} \quad (10)$$

With the sources discussed herein, a random bitrate in the range of 50 kbps to 150 kbps was achieved. A still higher value for bitrates can be obtained using faster source/detector combinations. It can be seen that all parameters in Relation (9) for the maximum overlap c discussed in the case of the entangled photon pairs source, vary with the number of beam splitters in the setup. Consequently, the bitrate either increases or decreases, depending on which of these parameters has the dominant effect. For example, when the losses are low, typically between about 0.5 and about 1 dB, the first two parameters in Relation (9) increase much faster than the decline in the photon flux. Therefore, in such cases, there is a net increase in bitrate with the addition of a beam splitter. However, as losses become greater, typically in the range between about 2 and about 5 dB, the decline in photon flux becomes the dominant contributor to the random bit rate and hence it is indeed detrimental to add more beam splitters to the setup in this region of operation. In FIG. 2, the curve for attenuated laser achieves the maximum entropy per bit of 1.0 when the number of beam splitters is 2, 3 and 4. However, with the addition of beam splitters 3 and 4, there is no increase in the minimum entropy per bit of photon arrival events $H_\eta$, whereas the photon flux continues to decrease. Similarly, the curve for PPLN waveguides sees an increase in the minimum entropy per bit of photon arrival events $H_\eta$ of 6% when the number of beam splitters goes from 2 to 3 with an equal decrease in photon flux. However, since the number states also increases (($\log_2(N_v)+n$), a rise in bitrate of 3% is observed in this region. Thus, for the source/detector settings, the region between beam splitters 2 and 3 is optimal for quantum random number generator operation. This effect is more prominent when the quality of the source is lower, since a larger increase in the minimum entropy per bit of photon arrival events $H_n$ is seen with each beam splitter in such case.

To obtain the final bit sequences, a Toeplitz-hashing extractor was applied in order to separate noise in the channels from genuine randomness resulting from the source and the components, to realize a trusted-device quantum random number generators. In implementations where the output bits are certified to be random, by loophole free violation of Bell tests for example, such a postprocessing step may not be necessary. The implemented Toeplitz matrix has dimensions n×m with n=100 and m given by the minimum entropy per bit of photon arrival events $H_n$. Raw bits are multiplied with the Toeplitz matrix and the resulting bit sequences are passed through the Diehard test suite for statistical randomness. In total, 96 MITs of data collected from various configurations were tested and all tests were passed in each case.

It is thus shown that high performance is achieved by scaling the minimum entropy per bit of photon arrival events in quantum random number generators even using affordable, lower quality sources and detectors, in particular in view of commercialization of quantum random number generators for instance.

As people in the art will appreciate, in the method as presented herein, time multiplexing of virtual and physical modes created by cascaded beam splitters results in increased randomness while reducing the number of detector channels needed to encode random bit sequences. Thus, quantum random number generators performance is improved with the addition of a beam splitter while the system complexity is minimally affected. Furthermore, the minimum entropy per bit of photon arrival events may be monitored to increase performance. Obtained results show that simple, off-the-self telecommunication components such as continuous wave lasers, fiber beam splitters, and fiber delays may be used for practical random number generation, which is of particular interest for commercial applications. Flexibility in quantum random number generation is thus provided since the performance parameters may be tuned as per the application requirements.

There is thus presented a method and a system for flexible bitrate and randomness scaling in quantum random number generators without changing the source or the detector of the quantum random number generators, and with minimal increase of system complexity since simple, off-the-shelf telecommunications components such as beam splitters and delays are used in a time multiplexing scheme to increase the number of states a detected photon can occupy, thereby increasing the randomness of the produced bits, with the addition of each beam splitter. Any source of single photons may be selected, and both the random bitrate and the minimum information entropy of the detected photons are increased by introducing additional temporal states, hence increasing dimensionality, with the addition of beam splitters and delays. The method and system allow a tunable control over both randomness and random bit generation rate of commercial quantum random number generators, in addition to being compatible with multiple integration/free space/fiber platforms, towards the development of low-cost, commercial quantum random number generators.

The method and system apply to higher dimensional quantum random number generators that encode bit sequences using degrees of freedom such as time, frequency, phase noise, vacuum fluctuations and spatial modes. The method and system apply to temporal mode quantum random number generators that use arrival time of single photons with reference to an external lab clock to derive random bits. The method and system apply to trusted-device quantum random number generators where genuine randomness is ensured through a detailed characterization of sources and components.

The method and system apply to quantum random number generators in a range of applications, such as photonics applications or applications based on particle decay or atomic transitions for example.

The method and system may be used to improve performance of quantum random number generators that are limited by the source, for example entangled photon sources, nonlinear materials sources exhibiting Chi2 or Chi3 nonlinearity for example, or attenuated laser sources. The method and system may also be used to improve performance of quantum random number generators that are limited by the employed detectors, for example superconducting nanowires, transition edge sensors, avalanche photodiodes, charge coupled device cameras, and photomultiplier tubes.

The method and system apply to fiber-based, free-space, chip-based or micro-optical integrated quantum random number generator platforms. The method and system apply to commercial quantum random number generators where state-of-the-art components for research cannot be used for mass production.

The scope of the claims should not be limited by the embodiments set forth in the examples, but should be given the broadest interpretation consistent with the description as a whole.

The invention claimed is:

1. A method for entropy scaling in quantum random number generators, comprising:
dividing a single photon source of single photons into two paths in a first in a cascade of beam splitters $BS_1$, $BS_2$, . . . , consecutive beam splitters being separated by a fiber length length of fiber, each beam splitter in the cascade dividing an input spatial mode into, at an output, two equally probable modes that are temporally delayed due to the fiber lengths traversed by each mode, until a last beam splitter $BS_n$; yielding a number $1=2^n$ of temporal states for each photon, where n is the number of the beam splitters in the cascade;
detecting first a first set of temporal states 1 created by the beam splitter cascade by measuring photons a photon rate in a temporal window selected to measure with synchronisation to a generation time of the photons, using a heralding photon from a correlated source directly connecting the single photon source and a single-photon detector, wherein the heralding photon is used as a clock trigger to measure photon delay times and photon rates and encoding the first temporal states into;

detecting second a second set of temporal states $N_v$ with an arbitrary clock and encoding the temporal states of the second set into bit sequences by measuring a;

thereby generating an expanded state space of dimensions $N_v \times 1 \ N_v \times 1$.

2. The method of claim 1, comprising determining a minimum entropy per bit of photon arrival events $H_\eta$ as:

$$H_\eta = 1 - \frac{H_{dev}}{\log_2(Nv) + n},$$

where $H_{dev}$ accounts for non-idealities; and increasing the number of the beam splitters in the cascade, each additional beam splitter resulting in an increase of the minimum entropy per bit of photon arrival events $H_\eta$, as limited by the non-idealities and accumulated loss in the beam splitters.

3. The method of claim 1, comprising determining a minimum entropy per bit of photon arrival events $H_\eta$ as:

$$H_\eta = 1 - \frac{H_{dev}}{\log_2(Nv) + n},$$

where $H_{dev}$ accounts for non-idealities; and adding a beam splitter in the cascade, to increase a random bit rate defined as $H_\eta * (\log_2 (N_v) + n) *$ Detected Photon rate.

4. The method of claim 1, comprising determining a minimum entropy per bit of photon arrival events $H_\eta$ as:

$$H_\eta = 1 - \frac{H_{dev}}{\log_2(Nv) + n},$$

where $H_{dev}$ accounts for non-idealities; determining a range for the number of beam splitters optimizing minimum entropy per bit of photon arrival events $H_\eta$ depending on losses accumulated in the beam splitters; and adding at least one beam splitter in the cascade within the determined range, thereby increasing a random bit rate defined as $H_\eta * (\log_2 (N_v) + n) *$ Detected Photon rate.

5. The method of claim 1, comprising determining a minimum entropy per bit of photon arrival events $H_\eta$ as:

$$H_\eta = 1 - \frac{H_{dev}}{\log_2(Nv) + n},$$

where $H_{dev}$ accounts for non-idealities; determining a range for the number of beam splitters optimizing minimum entropy per bit of photon arrival events $H_\eta$, depending on losses accumulated in the beam splitters; and adding at least one beam splitter in the cascade within the determined range, thereby increasing a random bit rate defined as $H_\eta * (\log_2 (N_v) + n) *$ Detected Photon rate, the method further comprising at least one of: i) by changing source and detector parameters; and ii) changing beam splitters parameters in the cascade.

6. The method of claim 1, wherein the single photon source is an attenuated laser source.

7. The method of claim 1, wherein the single photon source is an entangled photon pairs source.

8. A method for entropy scaling in quantum random number generators, comprising successively dividing one initial spatial mode into two consecutive equally probable temporally delayed spatial modes; detecting a first set of resulting temporal states 1 with synchronisation to a photon generation time using a heralding photon from a correlated source directly connecting the single photon source and a single-photon detector and detecting a second set of resulting temporal states $N_v$ with an arbitrary clock, and encoding the temporal states of the second set into bit sequences.

9. The method of claim 8, using a cascade of fiber-based beam splitters.

10. The method of claim 8, using a cascade of fiber-based beam splitters and fiber delays.

11. The method of claim 8, using a cascade of fiber-based beam splitters, a number of the beam splitters being n, and adding at least one beam splitter in the cascade.

12. The method of claim 8, comprising using one of: entangled photon sources, nonlinear materials sources and attenuated laser sources.

13. The method of claim 8, comprising using one of: detectors superconducting nanowires detectors, transition edge detectors, avalanche photodiodes detectors, charge coupled device cameras detectors, and photomultiplier tubes detectors.

* * * * *